United States Patent [19]
McAdams

[11] 3,908,369
[45] Sept. 30, 1975

[54] TURBO-SUPERCHARGER EXHAUST

[75] Inventor: Paul F. McAdams, St. Joseph, Mich.

[73] Assignee: Clark Equipment Company, Buchanan, Mich.

[22] Filed: May 6, 1974

[21] Appl. No.: 467,171

[52] U.S. Cl. ............... 60/280; 60/322; 180/64 A; 277/57; 285/48; 285/331
[51] Int. Cl.² ............................................ F01N 5/04
[58] Field of Search ......... 285/13, 14, 41, 187, 223, 285/330, 10, 11, 331; 277/53, 55, 56, 57; 60/687, 272, 280, 317, 320, 322, 323, 324, 60/39.32, 308; 180/64 A

[56] References Cited
UNITED STATES PATENTS

| | | | |
|---|---|---|---|
| 1,244,722 | 10/1917 | Finne | 285/13 X |
| 2,130,385 | 9/1938 | Fluor, Jr. et al. | 60/320 X |
| 2,583,430 | 1/1952 | Kadenacy | 60/280 X |
| 2,677,231 | 5/1954 | Cornelius | 60/308 |
| 2,806,347 | 9/1957 | Pertile | 60/308 X |
| 3,520,131 | 7/1970 | Briggs | 60/308 |

FOREIGN PATENTS OR APPLICATIONS

| | | | |
|---|---|---|---|
| 6,186 | 3/1903 | United Kingdom | 285/11 |
| 20,983 | 10/1914 | United Kingdom | 285/10 |
| 149,893 | 6/1937 | Austria | 277/56 |
| 739,715 | 11/1955 | United Kingdom | 60/308 |
| 1,185,488 | 2/1959 | France | 277/57 |

*Primary Examiner*—Werner H. Schroeder
*Assistant Examiner*—Moshe I. Cohen
*Attorney, Agent, or Firm*—Kenneth C. Witt

[57] ABSTRACT

A stress-free exhaust construction for a turbo-supercharger on an engine, having an adjacent wall through which exhaust gases are discharged. A rigid conduit member is connected to and extends away from the supercharger. A second rigid conduit member in alignment with the first conduit extends through the wall. There are cooperating baffles at the adjacent ends of the two conduit members which provide a non-rigid connection between the two conduit members and a tortuous passage for gases between the inside and the outside of the connection.

5 Claims, 2 Drawing Figures

U.S. Patent  Sept. 30,1975  3,908,369

TURBO-SUPERCHARGER EXHAUST

BACKGROUND OF THE INVENTION

1. Field of the Invention

This invention relates to connection conduits or pipes for directing the exhaust gases from a turbo-supercharger through an adjacent wall. It is particularly useful in vehicles in which the wall is one part of an enclosure surrounding an engine equipped with a turbo-supercharger, although it is not limited to such use.

2. Description of the Prior Art

It is known that turbine driven superchargers, or turbo-superchargers as they are referred to herein, operate at high temperatures, that is, the turbine, which is driven by exhaust gases from the engine operates at high temperatures. Because of such high temperatures the metal of which the gas turbine housing is made loses considerable strength as compared to its strength at a lower temperature, and this produces difficulties in providing a satisfactory exhaust pipe or conduit connected to the turbine housing for directing the exhaust gases away from the turbo-supercharger. The stresses on the housing must be minimized. The problem is particularly acute when it is necessary that the exhaust pipe or conduit must pass through the wall of an enclosure so that the exhaust gases are discharged outside or on the other side of the wall.

It will be appreciated by those skilled in the art that in a turbo-supercharger installation on a diesel engine, for example, where the diesel engine is in a vehicle which includes an enclosure for the engine, that there is considerable vibration of the engine during operation. This means relative movement between the turbo-supercharger on the engine and the surrounding enclosure and thus considerable care must be exercised in providing an exhaust conduit or pipe through the enclosure wall for the gases emanating from the turbo-supercharger so as not to place undue stress on the housing of the gas turbine which might cause such housing to be damaged.

It has been common heretofore to use a slip joint type connection in which a conduit portion connected to the supercharger housing is received inside a somewhat larger conduit portion which is secured to the wall or housing. The slide connection is generally constructed in such a manner as to allow sufficient motion due to vibration of the engine and also expansion of various parts when they are heated so that there will not be sufficient stress placed on the turbo-supercharger housing to damage such housing. Such connections, however, are inefficient insofar as transmitting the exhaust gases are concerned and particularly so if the connection happens to be in a stream of fast moving air resulting from the engine cooling fan as is frequently the case. That is, a considerable amount of exhaust gases may be discharged through the connection instead of out through the end of the exhaust pipe outside of the enclosure, and it is desirable to improve the efficiency and construction of such connections.

SUMMARY OF THE INVENTION

In carrying out my invention in one preferred form thereof I provide a first rigid conduit member which is connected to the turbo-supercharger and extends away from the supercharger. This conduit has baffle portions at its outer extremity. A second rigid conduit member is connected to and extends through an adjacent wall or enclosure, the second conduit member being in alignment with the first conduit member for receiving exhaust gases from the first conduit and transmitting them through the wall. The second conduit member also has baffle portions thereon which are interposed with the baffle portions on the first conduit member to provide a non-rigid connection between the first and second conduit members and a tortuous passage for gasses between the inside and the outside of the connection.

DESCRIPTION OF THE PREFERRED EMBODIMENT

Figure 1:
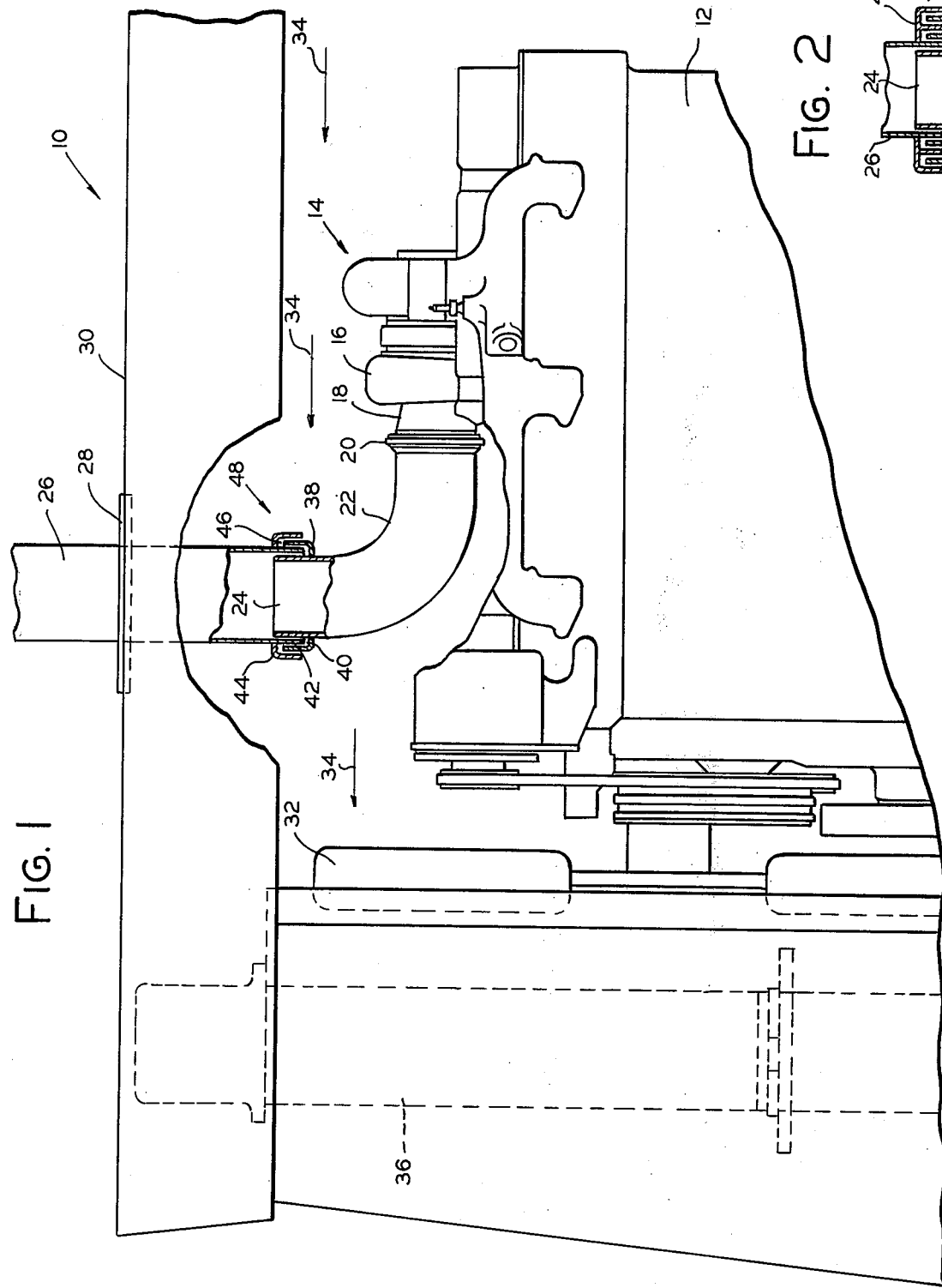
FIG. 1 of the drawing shows a fragmentary portion of a vehicle which embodies the present invention.

Referring to FIG. 1 of the drawing, there is shown a fragmentary portion of a heavy duty vehicle which is indicated generally by the numeral 10. Included in the vehicle is a diesel engine 12, and mounted on and operating in conjunction with the diesel engine is a turbo-supercharger indicated generally at 14. The turbo-supercharger includes a gas turbine at 16 with an exhaust housing indicated at 18 through which hot gases are discharged from the turbo-supercharger.

Connected to exhaust housing 18 by means of a rigid coupling 20 is a rigid conduit member 22 which is shown as having an elbow shape. In this preferred embodiment the cross-section of the conduit 22 is circular. The outer extremity 24 of the conduit 22 has baffle portions 38 thereon described in detail hereinafter.

In alignment with the outlet of the conduit member 22 and arranged to receive gases therefrom and discharge them to the atmosphere is a second rigid conduit member 26. As shown, conduit member 26 is in alignment with the outer end of conduit portion 22. Conduit member 26 is secured rigidly at 28 to the upper wall 30 of an enclosure which surrounds the engine 12. As shown, the engine drives a fan 32 which in this instance is a so-called pusher fan. The fan operates in a direction which causes cooling air to be drawn in the direction of the arrows 34 transversely past the connection, indicated generally at 48, between the two conduits and after passing through the fan such cooling air passes through a radiator which is indicated at 36.

Near the outer extremity 24 of conduit 22 and secured thereto is an annular baffle portion 38 which produces an annular space 40 in which is received the inner entrance or end 42 of conduit 26.

Conduit member 26 similarly has an annular baffle portion 44 secured thereon near the entrance end which produces an annular chamber 46 in which is located a part of baffle portion 38 as shown on the drawing.

Thus there is provided a non-rigid connection 48 between conduit 22 and conduit 26 which, as shown, provides a tortuous passage between the inside and the outside of the connection through which it is possible for gases to flow. It will be appreciated, however, that because of the tortuous nature of the passage through which the gas must flow that only a minimal amount will be drawn through such tortuous passage even though there is a continuous stream of cooling air flowing externally over and around the connection. It will be appreciated that it is desirable to construct the connection 48 with small clearances so as to minimize the escape of gases from inside the conduits through the connection 48. It will be appreciated also that it is not essential that the baffle portions have the specific configurations illustrated. Other configurations can be used which provide a tortuous passage through which the gases must flow in order to escape from inside the conduit 22,26 through the connection 48.

Figure 2:
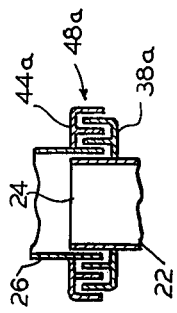
FIG. 2 shows a modified form of the invention.

FIG. 2 of the drawing shows a connection 48a having configuration which embodies a double annular baffle portion 38a on the conduit member 22, and an interposed or interfitting double annular baffle 44a on conduit member 26. It will be understood that connection 48a can be substituted for connection 48 of FIG. 1 if desired.

It is not critical to construct the connection 48 or connection 48a in such a way as to completely avoid contact between conduit member 26 and conduit member 22 and their respective baffle portions under all circumstances. That is, some contact under operating conditions when there is considerable vibration is not objectionable as long as it does not produce undue stress on exhaust housing 18 of the turbo-supercharger.

While I have disclosed herein the best mode contemplated for carrying out my invention as required by statute, it will be appreciated that modifications may be made by those skilled in the art. Accordingly, it should be understood that I intend to cover by the appended claims all such modifications which fall within the true spirit and scope of my invention.

I claim:

1. An exhaust construction for a turbo-supercharger on an engine, having a wall adjacent the engine through which exhaust gases are discharged, comprising a first rigid conduit member connected to and extending away from the turbo-supercharger, a first baffle portion attached to the outer extremity of the said first conduit member, a second rigid conduit member secured to and extending through the wall, the said second conduit member having its entrance end aligned with the said first conduit member for receiving exhaust gases therefrom and transmitting them through the wall, and an additional baffle portion attached to the said entrance end of the second conduit member, the said additional baffle portion interposed with the said first baffle portion to provide a non-rigid connection between the said first and second conduit members and a tortuous passage for gases between the inside and the outside of the connection.

2. An exhaust construction as in claim 1 in which there is a flow of air externally past the said non-rigid connection, and the said connection is arranged transversely to the direction of such air flow.

3. An exhaust construction as specified in claim 1 in which the said first baffle portion comprises an annular portion which surrounds the said entrance end of the said second conduit, and the said additional baffle portion comprises an annular portion which surrounds the said first baffle portion.

4. An exhaust construction as specified in claim 1 in which the said first baffle portion comprises a double annular portion which surrounds the entrance end of the said second conduit, and the said additional baffle portion comprises a second double annular portion which interfits with the said first double annular portion.

5. The combination of an internal combustion engine having a turbo-supercharger thereon and a fan arranged to move cooling air over the engine and turbo-supercharger, a wall adjacent the engine through which exhaust gases are discharged, a first rigid exhaust conduit member connected to and extending away from the said turbo-supercharger, a first baffle portion attached to the outer extremity of the said first conduit member, a second rigid conduit member secured to and extending through the said wall, the said second conduit member having its entrance end aligned with the said first conduit member for receiving exhaust gases therefrom and transmitting them through the wall, an additional baffle portion attached to the said entrance end of the second conduit member, the said additional baffle portion interposed with the said first baffle portion to provide a non-rigid connection between the said first and second conduit members and a tortuous passage for gases between the inside and the outside of the connection, and the said elements arranged so that there is a flow of air externally past the said non-rigid conanection, such air flow direction being transverse to the direction of flow of exhaust gases through the said connection.

* * * * *